United States Patent Office 2,936,503
Patented May 17, 1960

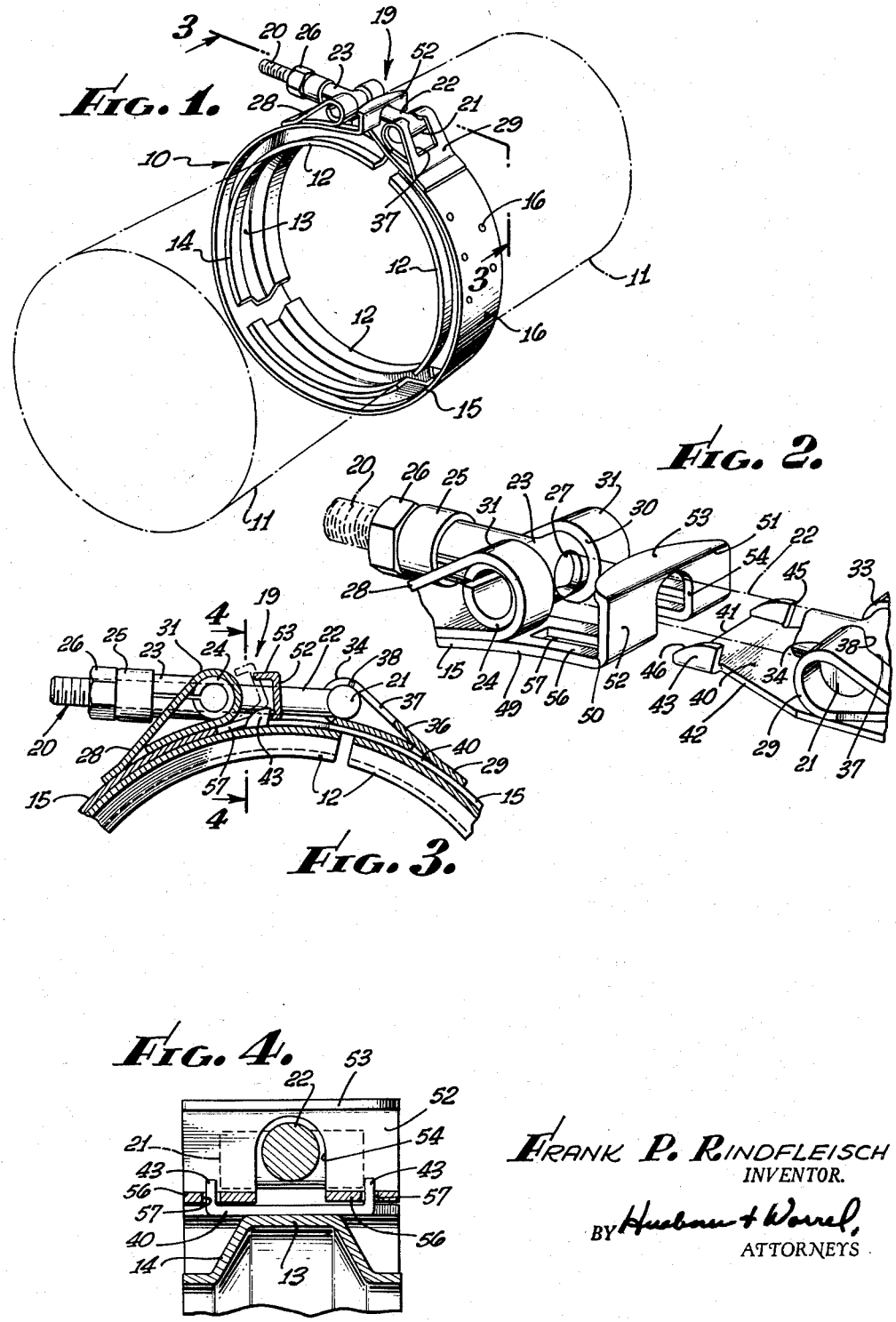

2,936,503

SAFETY LATCH FOR BAND CLAMPS

Frank P. Rindfleisch, Hollywood, Calif., assignor to Aeroquip Corporation, Jackson, Mich., a corporation of Michigan Application November 25, 1957, Serial No. 698,478

3 Claims. (Cl. 24—279)

This invention relates to a latching mechanism for band clamps for flexible hose connections and tube or pipe couplings, and more particularly to that type of latch assembly commonly known as a "T-bolt."

Latch assemblies of the T-bolt and quick-coupler type are employed in band clamps for flexible hose connections and in coupling devices for connecting together the ends of conduits or tubes adapted to carry fluid under pressure. They are used extensively for aircraft as, for example, in the cabin pressure system thereof. Though latch mechanisms of the above mentioned type are designed with the view to making them capable of withstanding strong jarring impacts, vibrations of high frequency, and high and fluctuating internal pressures, it is important to insure that should the T-bolt or other latch components fail in service, the latch will still hold the band clamp secure enough to prevent appreciable fluid leak. It is primarily to this end of providing a safe latch that this invention is directed.

It is a general object of this invention to provide a latch mechanism of the above mentioned character having auxiliary or secondary latch means which become operative to secure the band clamp in the event of failure of the T-bolt or its associated parts.

Another object is to provide an improved quick-coupler latch mechanism having the aforementioned safety features.

A further object is to provide a T-bolt type quick-coupler latch mechanism having a snap action when being tightened around an object, by which the operator may audibly and visibly determine when optimum torque has been applied in the tightening operation.

Another object is to provide a safety latch mechanism of the above mentioned character which is capable of being disconnected easily and quickly as with a simple tool such as a screw driver.

Further objects and advantages of this invention will appear during the course of the following part of the specification wherein the details of construction and mode of operation of a preferred embodiment are described with reference to the accompanying drawing in which:

Fig. 1 is a perspective view of a latch mechanism of this invention embodied in a V-band type coupler tightened around the adjoining ends of two aligned tubes which appear in phantom;

Fig. 2 is a perspective view of the latch mechanism on an enlarged scale and shown in open position;

Fig. 3 is a vertical longitudinal section through the latch mechanism taken substantially on line 3—3 of Fig. 1; and Fig. 4 is a transverse section taken on line 4—4 of Fig. 3.

Referring to the drawing in detail there is shown, as an example of the invention, a coupling device designated generally by reference numeral 10 designed for attaching the adjacent flanged ends of two aligned pipes 11. The pipe coupler includes a plurality of jaw segments 12, there being three jaw segments in the illustrated embodiment, each having a web or crown portion 13 and two radially inwardly diverging side walls 14 which serve to engage the pipe flanges and to exert a wedging action upon them in drawing them toward each other. These segments are attached to the inside surface of a constrictor band 15 as by spot welding 16. For band clamps which are employed around a flexible hose to connect the hose to a conduit, the band need not include the jaw segments 12.

The end portions of the constrictor band are interconnected through a latch assembly designated generally by reference numeral 19. Such assembly includes a latch bolt 20 having a T-head 21; a shank 22, the outer end portion of which is screw-threaded; a T-sleeve 23 having two trunnions 24 extending laterally of the stem portion of the sleeve; a centrally apertured cap 25 fitting over the free end of the stem of the T-sleeve, and a nut 26 threadably received on the shank of the T-bolt and engageable with the cap. The T-bolt extends through the cap and through the stem portion of the T-sleeve, there being an opening 27 in the trunnion head of the T-sleeve for accommodating the T-bolt.

There are two straps 28 and 29 secured to the outside surfaces of the end portions, respectively, of the constrictor band. Each of the straps is formed into a loop, the leg portions of the loops being overlapped and secured as by spot welding to the band 15.

The loop of the strap 28 is centrally apertured or cut out at 30 to accommodate the stem of the T-sleeve and the shank of the T-bolt. Such cut-out provides two laterally spaced bearing loops 31 in which the trunnions 24 are received for pivotal movement of the T-sleeve on the axis of the trunnions. Likewise the loop of the strap 29 is centrally apertured at 33 to provide two laterally spaced bearing loops 34 in which the end portions or trunnions of the T-head are received for pivotal movement. The outwardly disposed leg of the strap 29 is designated by numeral 36 and the aperture 33 formed in the loop portion of that strap extends longitudinally of such outer leg as a widened portion 37 to permit insertion of the T-head 21 into the aperture 33 from a position outwardly or above the widened portion of the aperture.

The end portions of the band clamp are interconnected by first turning the nut to move it toward the free end of the bolt shank and then inserting the T-head 21 into the loop of strap 29 through the widened portion 37 of its aperture. The trunnion ends of the T-head will become received in the bearing loops 34, the neck portion of the bolt shank being received in the narrower portion of the aperture 33. There are shoulders 38 along which the widened portion 37 of the aperture converges into the narrower portion of the aperture, and as said shoulders are disposed above the head of the bolt when received in the bearing loops, the bolt is prevented from being inadvertently dislodged from the looped strap 29. Turning of the nut 26 in a direction to move it toward the head of the bolt will cause the shank of the T-bolt to move longitudinally through the sleeve in a direction of the head toward the sleeve thereby drawing the trunnion bearing loops toward each other, and constricting the band around the ends of the pipe sections 11.

Because band clamps are subjected to severe jars and vibrations in service, it is possible that the nut 15 may become loosened, or the loop straps broken or disconnected from the constrictor band, or there may be failure of the trunnions of the T-sleeve, or disengagement of the T-bolt from the loop straps. According to this invention, safety against these possible contingencies is insured by providing for interconnection of the two band ends upon the failure of the T-bolt latch assembly.

Referring to Fig. 2 of the drawing that end portion of the band to which the looped strap 29 is fixed, is designated by reference numeral 40 and its end edge by numeral 41. The side edges of portion 40 are cut out at 42 to define two ears 43 extending laterally from the portion 40 adjacent the end edge of the band. Such ears are then bent along bend lines 44 to extend radially outwardly from the plane of the band end portion and preferably perpendicular thereto to form the ears as upstanding hooks. A hook edge 45 of each hook is inclined at a slight angle in a direction away from the end edge of the band, while the opposite edge 46 of the hooks, which merge into the end edge of the band, are preferably arcuate.

The other end portion of the band is designated by numeral 49. It is bent along two parallel and transversely extending bend lines 50 and 51, each bend being preferably about 90° to define a hook keeper having an upright or outwardly extending flange 52 and a tang 53 generally parallel to the band. The flange 53 has a slot 54 formed centrally therein to accommodate the shank 22 of the T-bolt and that slot is extended centrally in the end portion of the band whereby the keeper may be lifted upwardly without engagement with the T-bolt, as to the dotted line position thereof shown in Fig. 3.

The slot 54 divides the band into two flat strip portions 56. Each of the strips has an elongate slot 57 formed therein extending longitudinally of the band. As best appears in Fig. 3 of the drawing, these slots extend substantially to the inside surface of the flanged portion 52.

Referring again to the operation of the T-bolt in being tightened, it will be observed that as the two loops 28 and 29 are drawn toward each other, the keeper will engage the rounded edges 46 of the hooks along the inside surface of the band adjacent the bend line 50. As the nut 26 is rotated to continue the tightening operation, the keeper will ride up upon the arcuate edges 46 as in the dotted line position shown in Fig. 3 until the end edges of the slot nearest the flange 52 are disposed above the slant edges 45 of the hooks, whereupon the keeper will snap radially inwardly of the band and the hooks will extend upwardly through the slots 57. Such snap action is audible to the operator and for a band clamp which has been designed to be constricted around an object of predetermined size, the operator will know from the audible snap that optimum torque has been applied to the nut and that no further tightening of the band is required.

Should the T-bolt latch assembly fail, the inclined edges 45 of the hooks will engage respective end edges of the slots 57 thereby to maintain the band with its ends interconnected and still tightened around the object encircled by it.

An important feature of the illustrated embodiment of the band clamp of this invention is that the safety or secondary latch provided by the hooks 43 and slots 57 is formed in the strip which constitutes the constrictor band, and not, for example, in separate straps which may be attached to the band. Thus in the instance of failure of the T-bolt assembly, the overlapped end portions of the band become interconnected to secure the clamp against release.

To disengage the hooks from the slots 57 it is a simple operation to lift the keeper end of the band radially outwardly as with a screw driver engaged under the tang 53 to lift the keeper radially outwardly of the band and from the hooks as to the dotted line position of Fig. 3.

While the instant invention has been shown and described herein, in what is conceived to be the most practical and preferred embodiment, it is recognized that departures may be made therefrom within the scope of the invention, which is therefore not to be limited to the details disclosed herein, but is to be accorded the full scope of the claims.

What I claim is:

1. A band clamp adapted to be tightened around an object and comprising a generally annular band having an outside surface and at least two band end portions having respective end edges, a latch assembly secured to the outside surfaces of the band end portions adjacent said end edges respectively, said assembly including a screw-threaded member extending longitudinally over the band end portions and being disposed radially outwardly of the band end portions for tightening the band, one band end portion having an elongate slot formed therewithin and extending longitudinally of the band, the other band end portion having a hook projecting radially outwardly from the band and receivable in said slot when the band end portions are overlapped with said one band end portion being disposed upon the outside surface of said other band end portion, said hook being movable longitudinally in said slot and being engageable with an end edge of the slot upon the loosening of said threaded member.

2. A quick-coupling band clamp adapted to be tightened around an object and comprising a generally annular band having at least two end portions, said end portions having respective outside surfaces, two bearing loops secured to the outside surfaces of the end portions, respectively, a bolt having a shank and a cross-head, a T-sleeve having trunnions journaled in one of the bearing loops, the bolt shank being longitudinally movable in the sleeve, a nut threadably received on the bolt shank and arranged to draw the bolt head in a direction toward the sleeve, the other bearing loop having an aperture formed therein of a size large enough to permit reception of the bolt head, and hook and slot means in the band end portions for interconnecting the end portions upon loosening of the nut.

3. The band clamp of claim 2 in which one end portion of the band has two upstanding hooks and the other end of the band has two elongate slots formed therein for receiving the hooks respectively.

References Cited in the file of this patent
UNITED STATES PATENTS

| | | |
|---|---|---|
| 673,382 | Chaffee | May 7, 1901 |
| 1,441,154 | Johnson | Jan. 2, 1923 |
| 2,374,541 | Hartman | Apr. 24, 1945 |
| 2,711,572 | Christophersen | June 28, 1955 |
| 2,846,016 | Hanes | Aug. 5, 1958 |